(12) United States Patent
Wolf et al.

(10) Patent No.: US 11,595,838 B2
(45) Date of Patent: Feb. 28, 2023

(54) EVENT DEVICE MAINTENANCE (71) Applicant: Honeywell International Inc., Charlotte, NC (US)

(72) Inventors: Benjamin H. Wolf, Leicester (GB); Hariprasad Kozhikkotakathitta Veetil, Bangalore (IN); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 100 days.

(21) Appl. No.: 17/168,444

(22) Filed: Feb. 5, 2021

(65) Prior Publication Data

US 2022/0256365 A1    Aug. 11, 2022

(51) Int. Cl.
*H04W 24/04* (2009.01)
*H04B 17/318* (2015.01)
*H04W 4/90* (2018.01)

(52) U.S. Cl.
CPC .......... *H04W 24/04* (2013.01); *H04B 17/318* (2015.01); *H04W 4/90* (2018.02)

(58) Field of Classification Search
CPC .................................................. H04W 24/04
See application file for complete search history.

(56) References Cited

U.S. PATENT DOCUMENTS

| | | | |
|---|---|---|---|
| 9,189,378 B1* | 11/2015 | Ryan | G06F 11/3668 |
| 10,484,114 B1* | 11/2019 | Nijim | H04L 41/12 |
| 2012/0289158 A1* | 11/2012 | Palin | H04W 8/005 |
| | | | 455/41.2 |
| 2016/0125319 A1* | 5/2016 | Morgan | G06Q 20/10 |
| | | | 705/5 |
| 2018/0114431 A1 | 4/2018 | Volam et al. | |
| 2019/0075025 A1* | 3/2019 | McCann | G08B 21/182 |
| 2019/0088109 A1 | 3/2019 | Norton et al. | |
| 2019/0146444 A1* | 5/2019 | Brown | G06K 19/0717 |
| | | | 340/514 |
| 2021/0065536 A1 | 3/2021 | Dearden et al. | |

OTHER PUBLICATIONS

Extended European Search Report for related European Application No. 22152103.2, dated Jul. 4, 2022 (8 pgs).

* cited by examiner

*Primary Examiner* — Edan Orgad
*Assistant Examiner* — Won Tae C Kim
(74) *Attorney, Agent, or Firm* — Brooks, Cameron & Huebsch, PLLC (57) ABSTRACT

Devices, systems, and methods for event device maintenance are described herein. In some examples, one or more embodiments include a mobile device comprising a user interface, a memory, and a processor to execute instructions stored in the memory to receive an inventory including a group of event devices, generate a device identification analysis for the group of event devices, display on the user interface the device identification analysis, receive an input for an event device of the group to take an audit action, and initiate the audit action to be taken by the event device of the group in response to the input.

20 Claims, 4 Drawing Sheets

EVENT DEVICE MAINTENANCE

TECHNICAL FIELD

The present disclosure relates to devices, systems, and methods for event device maintenance.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of event devices (e.g., hazard sensing devices, input devices, output devices, etc.) located throughout the facility (e.g., on different floors and/or in different rooms of the facility) that can perform an action when a hazard event is occurring in the facility and provide a notification of the hazard event to the occupants of the facility via alarms or other mechanisms.

Maintaining the alarm system can include regular testing of event devices. Such regular testing may be mandated by codes of practice in an attempt to ensure that the event devices are functioning properly.

DETAILED DESCRIPTION

Devices, systems, and methods for event device maintenance are described herein. In some examples, one or more embodiments include a mobile device comprising a user interface, a memory, and a processor to execute instructions stored in the memory to receive an inventory including a group of event devices, generate a device identification analysis for the group of event devices, display on the user interface the device identification analysis, receive an input for an event device of the group to take an audit action, and initiate the audit action to be taken by the event device of the group in response to the input.

Maintenance of event devices can include a first user (e.g., such as a technician, engineer, etc.) walking around the facility and visually checking the alarm system components, typically, at the same time as they carry out functional testing of event devices and other components of the alarm system. For example, carrying out smoke testing of fire sensors and visual inspection of fire sensors at the same time the inspector is close enough to visually inspect each fire sensor. While the first user is functionally testing and visually inspecting event devices, a second user may typically interpret signals received at the alarm system control panel. Such signals can be the result of the first user functionally testing event devices in the facility.

Such a manual testing process between the second user at the control panel and the first user testing event devices in the facility may be subject to error. For instance, the first user may identify and test an event device in a space of the facility and activate such a device while the second user views the output from the event device on the alarm system control panel. The first user has to be in continuous communication with the second user to ensure the correct event device is tested, as identifying an incorrect event device can lead to errors in the testing process.

Additionally, in some instances the first user may identify and test an event device in a space of the facility that has multiple event devices. In such an instance, the first user may test a first event device while misinterpreting it to be a second event device as the first and second event devices may be located proximately to one another. Further, in some examples such a facility may not have a network relationship available for the first user to be in communication with the second user and/or the alarm system control panel so that the first user is able to verify they have tested the first event device and not the second event device.

Event device maintenance according to the present disclosure can allow for a user to differentiate between different event devices for testing in a facility. Such an approach can allow a mobile device to be in communication with an event device even if the mobile device may not be in communication with an alarm system control panel. Additionally, the mobile device can allow the user to more easily determine which event device they are interacting with even in an instance where multiple event devices are located near the mobile device as compared with previous approaches. Accordingly, such an approach can ensure a user is able to confirm which event device they are interacting with to avoid errors in the testing process.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 402 in FIG. 4.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
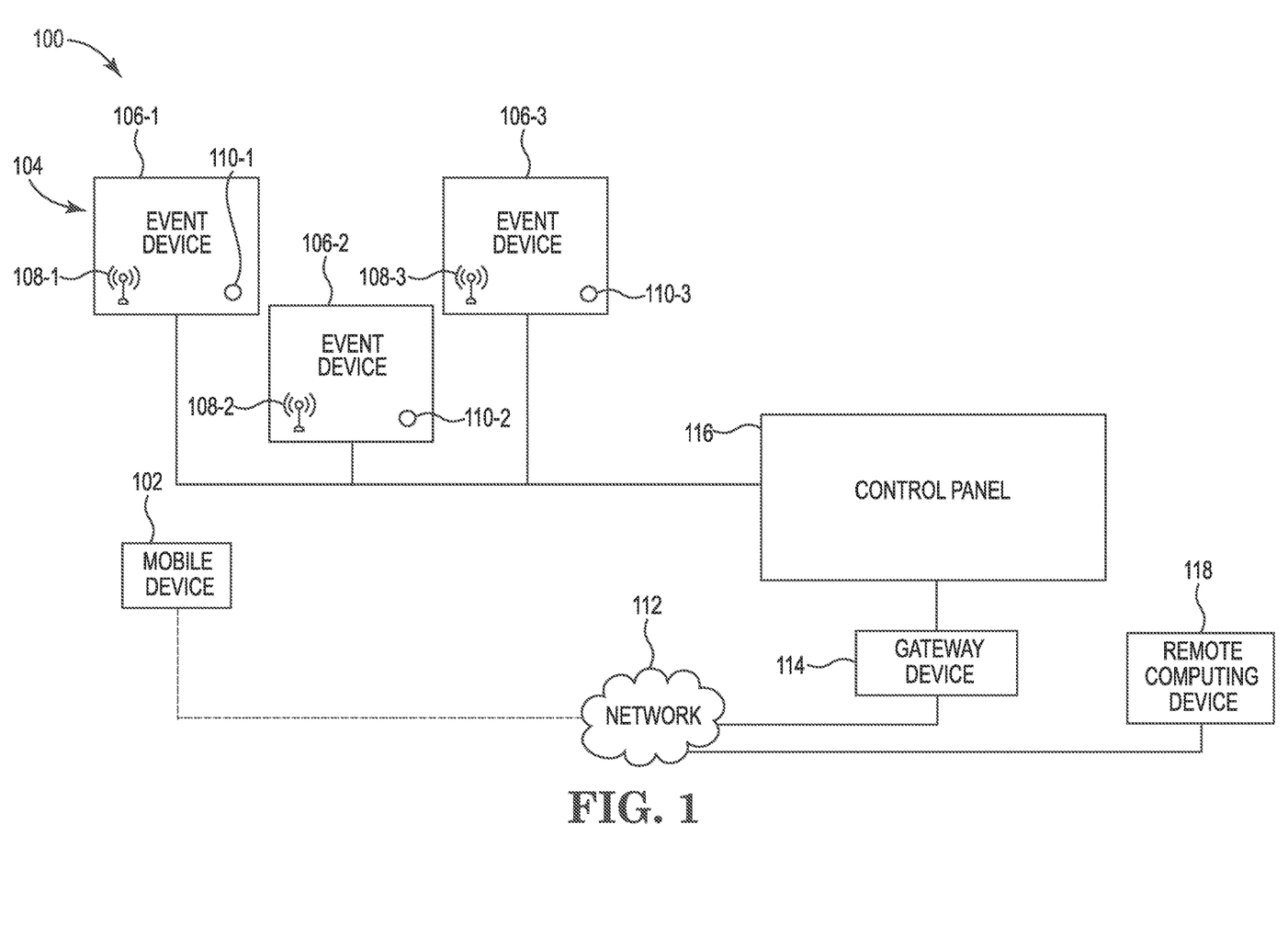
FIG. 1 is an example of a system for event device maintenance, in accordance with one or more embodiments of the present disclosure.

FIG. 1 is an example of a system 100 for event device maintenance, in accordance with one or more embodiments of the present disclosure. The system 100 can include a mobile device 102, a group 104 of event devices 106-1, 106-2, 106-3, a network 112, a gateway device 114, a control panel 116, and a remote computing device 118. Each of the event devices 106-1, 106-2, 106-3 can include a beacon 108-1, 108-2, 108-3, respectively, and an indicator 110-1, 110-2, 110-3, respectively.

As illustrated in FIG. 1, the system 100 can include a control panel 116. As used herein, the term "control panel" refers to a device to control components of an alarm system of a facility. For example, the control panel 116 can be a fire control panel that can receive information from event devices 106-1, 106-2, 106-3 (referred to collectively herein as event devices 106) and determine whether a hazard event is occurring or has occurred.

The control panel 116 can be connected to the group 104 of event devices 106. As used herein, the term "event device" refers to a device that can receive an input relating to an event and/or generate an output relating to an event. Such an event can be, for instance, a hazard event such as a fire. For example, an event device can receive an input relating to a fire occurring in the facility. Such event devices 106 can be a part of an alarm system of the facility and can include devices such as fire sensors, smoke detectors, heat detectors, carbon monoxide (CO) detectors, or combinations of these; interfaces; pull stations; input/output modules; aspirating units; and/or audio/visual devices (e.g., speakers, sounders, buzzers, microphones, cameras, video displays, video screens, etc.), among other types of event devices.

These event devices 106 can be automatic, self-test devices, such as smoke detectors, heat detectors, CO detectors, and/or others. Such self-test devices can include mechanisms that generate aerosols, heat, carbon monoxide, etc. and sense these items as appropriate to the type of device being tested in the device to test the performance of the device. This can, for example, be to test the event device's thermal and/or photo sensing capabilities.

The event devices 106-1, 106-2, 106-3 can be included in a group 104. Although the group 104 is illustrated in FIG. 1 as including three event devices 106-1, 106-2, 106-3, embodiments of the current disclosure are not so limited. For example, the group 104 can include more than three event devices or less than three event devices. Additionally, the system 100 can include more than one group 104 of event devices.

Each of the event devices 106 can include a beacon 108. For example, event device 106-1 can include a beacon 108-1, event device 106-2 can include a beacon 108-2, and event device 106-3 can include a beacon 108-3. As used herein, the term "beacon" refers to a wireless device that broadcasts radio signals. For example, the beacons 108-1, 108-2, 108-3 can emit radio signals to be detected by, for example, a mobile device such as mobile device 102. The beacons 108-1, 108-2, 108-3 can be Bluetooth, Bluetooth LE (e.g., Bluetooth Smart), Bluetooth low energy (BLE), among other types of beacons.

In some examples, each of the event devices 106 can include an indicator 110. For example, event device 106-1 can include an indicator 110-1, event device 106-2 can include an indicator 110-2, and event device 106-3 can include an indicator 110-3 (referred to collectively herein as indicators 110). As used herein, the term "indicator" refers to a signaling mechanism.

In some examples, the indicators 110 can be a visual indicator. For instance, the indicator 110-1 for the event device 106-1 can be a light emitting diode (LED) that, when activated, emits visible light so that a user of the mobile device 102 can locate the event device 106-1.

In some examples, the indicator 110-1 can be an audible indicator. For instance, the indicator 110-1 for the event device 106-1 can be an audio output device (e.g., a speaker, buzzer, etc.) that, when activated emits an audible sound so that a user of the mobile device 102 can locate the event device 106-1.

The mobile device 102 can be connected to the control panel 116 via a gateway device 114. As used herein, the term "gateway device" refers to a device to provide an interface between the control panel 116 and other devices. For example, the gateway device 114 can provide an interface between the mobile device 102 and the control panel 116/event devices 106.

As illustrated in FIG. 1, the control panel 116 can be connected to the mobile device 102 via the gateway device 114 and a network 112. As used herein, a mobile device can include devices that are (or can be) carried and/or worn by the user. Mobile device 102 can be a phone (e.g., a smart phone), a tablet, a personal digital assistant (PDA), smart glasses, and/or a wrist-worn device (e.g., a smart watch), among other types of mobile devices.

The mobile device 102 can be connected to the gateway device 114 via the network 112. For example, the network 112 can provide for a network relationship between the mobile device 102 and the gateway device 114/control panel 116. Such a network relationship can be a wired or wireless network connection. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As described above, in some instances the mobile device 102 may not be in communication with the control panel 116. For instance, a facility may not have a network relationship available such that the mobile device 102 is unable to be in communication with the network 112 (e.g., as illustrated by the dashed line in FIG. 1). For example, a Wi-Fi connection via the network 112 may not be available for the mobile device 102 (e.g., as a result of renovation, new construction, etc.) As another example, the mobile device 102 may be located in an area of the facility having event devices 106 but may not have LTE connectivity available via the network 112 in such an area. Accordingly, the mobile device 102 can be in communication with the event devices 106 without being in communication with the network 112, as is further described herein.

The mobile device 102 can receive an inventory of the group 104 of event devices 106. For instance, in some examples prior to losing communication with the network 112, the mobile device 102 can receive, via the network 112, an inventory of the group 104 of event devices 106 from the gateway device 114. The inventory can include an amount of event devices for a facility, for a space in the facility, etc. For example, the inventory received by the mobile device 102 can include the event devices 106-1, 106-2, 106-3 included in the group 104 of event devices.

Although the mobile device 102 is described above as receiving an inventory of the group 104 of event devices 106 from the gateway device 114, embodiments of the present disclosure are not so limited. For example, the mobile device 102 can receive an inventory of the group 104 of event devices 106 from the remote computing device 118 via the network 112, from another mobile device, and/or from any other source.

The control panel 116 can further transmit an enable signal to the group 104 of event devices 106. For example, the enable signal can be transmitted from the control panel 116 to each of the event devices 106. The enable signal can be transmitted to the group 104 when the control panel 116 is put in a service mode, such as during servicing and/or maintenance of the alarm system of the facility that includes the system 100. Such an enable signal can cause each event device 106-1, 106-2, 106-3 of the group 104 to enable their beacons 108-1, 108-2, 108-3, respectively. Such beacons 108 can be utilized to communicate with the mobile device 102 when the mobile device 102 is within range of the beacons 108, as is further described herein.

A user, such as a technician, engineer, etc., may carry mobile device 102 into different areas of the facility. For example, the user may carry the mobile device 102 into an area of the facility having the group 104 of event devices 106 in order to perform various actions that can include auditing, maintenance, inspection, and/or other actions related to the event devices 106. The user can utilize the mobile device 102 to perform such actions, even when a network relationship between the mobile device 102 and the network 112 is unavailable, as is further described herein.

The mobile device 102 can determine a signal strength between the mobile device 102 and each beacon 108 of each event device 106 of the group 104. When the mobile device 102 is within communication range of the beacons 108 of the event devices 106, the mobile device 102 can determine a signal strength between the mobile device 102 and the beacons 108 of each event device 106 of the group 104. For example, the mobile device 102 can determine a first signal strength between the mobile device 102 and the beacon 108-1 (e.g., −30 decibels (dBm), a second signal strength between the mobile device 102 and the beacon 108-2 (e.g., −50 dBm), and a third signal strength between the mobile device 102 and the beacon 108-3 (e.g., −60 dBm). The signal strength can be, for instance, a received signal strength indicator (RSSI), although embodiments of the present disclosure are not limited to RSSI. Accordingly, the mobile device 102 can determine that it has the highest signal strength with the beacon 108-1 of the event device 106-1, the lowest signal strength with the beacon 108-3 of the event device 106-3, and that the signal strength with the beacon 108-2 of the event device 106-2 lies therebetween.

The mobile device 102 can generate, using the inventory, a device identification analysis for the group 104 of event devices 106. The device identification analysis for the group 104 of event devices 106 can include a list of event devices 106 included in the inventory, as is further described herein.

Such a list of event devices 106 included in the inventory can be based on the signal strength between the mobile device 102 and each beacon 108 of each event device 106 included in the group 104. The list based on the signal strength can be sorted such that the event devices 106 can be included in the list from highest signal strength to lowest signal strength. For instance, the list of event devices 106 can include the event device 106-1 listed first having the beacon 108-1 having the highest signal strength with the mobile device 102, the event device 106-2 can be listed second having the beacon 108-2 having the next highest signal strength with the mobile device 102, and the event device 106-3 can be listed third as having the beacon 108-3 having the lowest signal strength with the mobile device 102.

The mobile device 102 can include an indication of which beacon 108 of an event device 106 of the group has the highest signal strength with the mobile device 102. As used herein, the term "indication" refers to a sign to direct attention to an item. As mentioned above, the event device 106-1 having the beacon 108-1 can include the highest signal strength to the mobile device of the group of event devices 106. Accordingly, the mobile device 102 can include an indication to direct attention to a user of the mobile device 102 that the beacon 108-1 has the highest signal strength with the mobile device 102. The indication can serve to easily notify a user of which of the event devices 106 of the group 104 has a beacon 108 that has the highest signal strength with the mobile device 102. The indication can include, for example, color coding, a marking that is uniquely different from markings associated with other event devices 106 of the group 104, among other types of indications, as is further described in connection with FIG. 2B.

The mobile device 102 can display the device identification analysis. For example, although not illustrated in FIG. 1, the mobile device 102 can include a user interface to display the device identification analysis. Such a user interface is further described in connection with FIGS. 2A, 2B, 3A, and 3B.

The user of the mobile device 102 can utilize the mobile device 102 to interact with event devices 106 of the group 104. For example, the user of the mobile device 102 may utilize the mobile device 102 to interact with the event device 106-1 that has the beacon 108 having the highest signal strength with the mobile device 102. The user can input information to the mobile device 102 to initiate an event device 106 to take an audit action, as is further described herein.

However, although the mobile device 102 is described above as interacting with the event device 106-1 that has the beacon 108 having the highest signal strength with the mobile device 102, embodiments of the present disclosure are not so limited. For example, the user of the mobile device 102 may utilize the mobile device 102 to interact with any of the other event devices 106-2, 106-3 that include beacons 108-2, 108-3 having a signal strength with the mobile device 102.

The mobile device 102 can receive, via the device identification analysis, an input for the event device 106 of the group 104 to take an audit action. As used herein, the term "audit action" refers to an act taken in furtherance of an inspection and/or examination of a device to evaluate and/or improve the devices specified condition, operation, or state. For example, the mobile device 102 can receive an input (e.g., a user input) for event device 106-1 to take an audit action.

The audit action can include, for instance, modifying an address and/or a label of the event device 106, recording inspection data about the event device 106, causing the event device 106 to perform a maintenance self-test, generating a report, among other types of audit actions as are further described in connection with FIG. 3A. The mobile device 102 can initiate the audit action to be taken by the event device 106 of the group 104 in response to the input.

Once the audit action is initiated by the event device 106, the mobile device 102 can upload the audit action to a remote computing device 118. For example, upon completion of the audit action by event device 106-1, and upon the mobile device 102 establishing/re-establishing a network relationship via the network 112, the mobile device 102 can upload the audit action taken by the event device 106-1 to the remote computing device 118. For instance, the mobile device 102 may interact with the event device 106-1 to record inspection data about the event device 106-1 (e.g., event device 106-1 passed a visual inspection by a user of the mobile device 102), and such information can be transmitted to the remote computing device 118 via the network 112 when such a network relationship is active between the mobile device 102 and the network 112. Such uploading to the remote computing device 118 can ensure that audit actions taken by the event devices 106 via the mobile device 102 are properly synced in a cloud-computing environment (e.g., via remote computing device 118), especially when the mobile device 102 does not have an established network relationship via the network 112.

As described above, a user of the mobile device 102 can carry the mobile device 102 into different areas of a facility to perform various actions that can include auditing, maintenance, inspection, and/or other actions related to the event devices 106. In some instances, a user may not be able to distinguish between two closely located event devices 106 (e.g., event device 106-1 and event device 106-2). In such an instance, and when a network relationship between the mobile device 102 and the network 112 is established, the mobile device 102 can transmit an indicator signal to the gateway device 114 for the event device 106 of the group 104.

For example, a user may have located event devices 106-1 and 106-2 in an area of the facility utilizing the mobile device 102. The mobile device 102 can indicate that the event device 106-1 has the beacon 108-1 having the highest signal strength with the mobile device 102. If the event device 106-1 is the event device 106 the user intends to interact with, the user can cause an input to the mobile device 102. In response to the input, the mobile device 102 may transmit an indicator signal via the network 112 to the gateway device 114. The gateway device 114 can transmit the indicator signal to the event device 106-1 via the control panel 116.

The event device 106-1 can receive the indicator signal and emit an indicator in response to receiving the indicator signal. For example, the event device 106-1 can receive the indicator signal from the gateway device 114/control panel 116 and emit an indicator. As described above, the indicator can be, for example, a visual indicator, an audible indicator, and/or a combination thereof. For instance, the event device 106-1 can activate an LED to emit a visible light (e.g., a strobe, continuous light, etc.) and/or activate an audio output device (e.g., a speaker, buzzer, etc.) to emit an audible sound. Such indicators can ensure a user of the mobile device 102 is interacting with the intended event device 106.

Figure 2A:
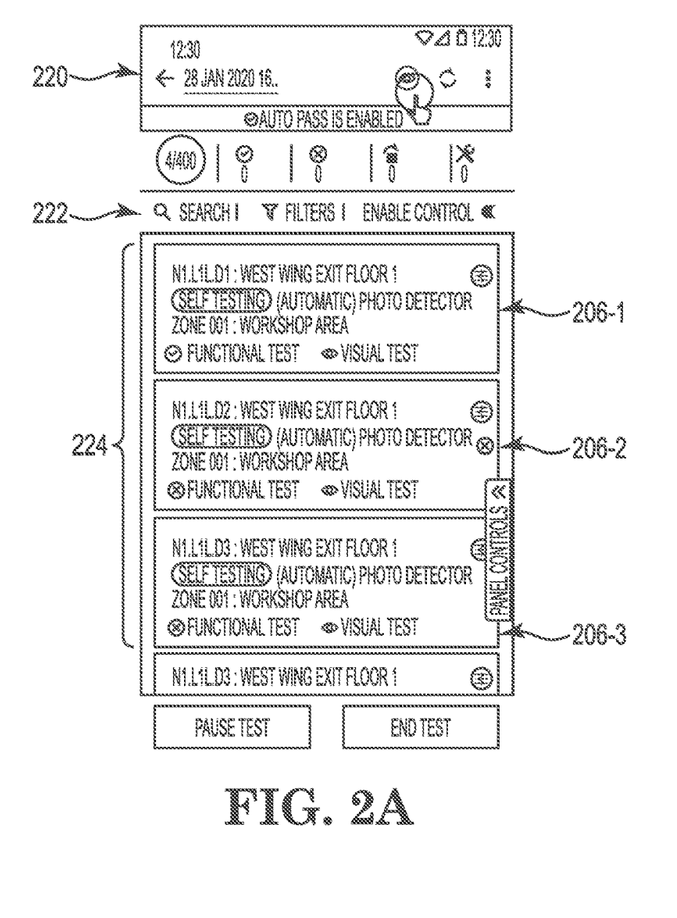
FIG. 2A is an illustration of a display provided on a user interface showing a device identification analysis including a list, generated in accordance with one or more embodiments of the present disclosure.

FIG. 2A is an illustration of a display provided on a user interface 220 showing a device identification analysis 222 including a list 224, generated in accordance with one or more embodiments of the present disclosure. The list 224 can include, for instance, information about event devices 206-1, 206-2, 206-3.

As illustrated in FIG. 2A, the user interface 220 can be displayed on a mobile device. For example, the mobile device can generate a device identification analysis 222 which can be displayed via the user interface 220. The device identification analysis 222 can include a list 224.

As illustrated in FIG. 2A, the list 224 can include event devices 206-1, 206-2, 206-3 (e.g., event devices 106-1, 106-2, 106-3, previously described in connection with FIG. 1). As previously described in connection with FIG. 1, such event devices 206 can each include a beacon. Accordingly, the list 224 can include a group of event devices 206 whose beacons have a signal strength with the mobile device.

The list 224 of event devices 206 can be based on a signal strength between the mobile device and each beacon of each event device 206 included in a group of event devices 206. The event devices 206 included in the list 224 can be listed from highest signal strength to lowest signal strength. For example, the event device 206-1 can have a beacon having the highest signal strength with the mobile device, the event device 206-3 can have a beacon having the lowest signal strength with the mobile device, and the event device 206-2 can have a beacon having a signal strength with the mobile device between that of the beacons of event device 206-1 and event device 206-3.

As previously described in connection with FIG. 1, there may be additional event devices in the facility. However, such devices may not include a beacon having a signal strength with the mobile device. In such an instance, those event devices having beacons that do not include a signal strength with the mobile device are not included in the list 224.

Figure 2B:
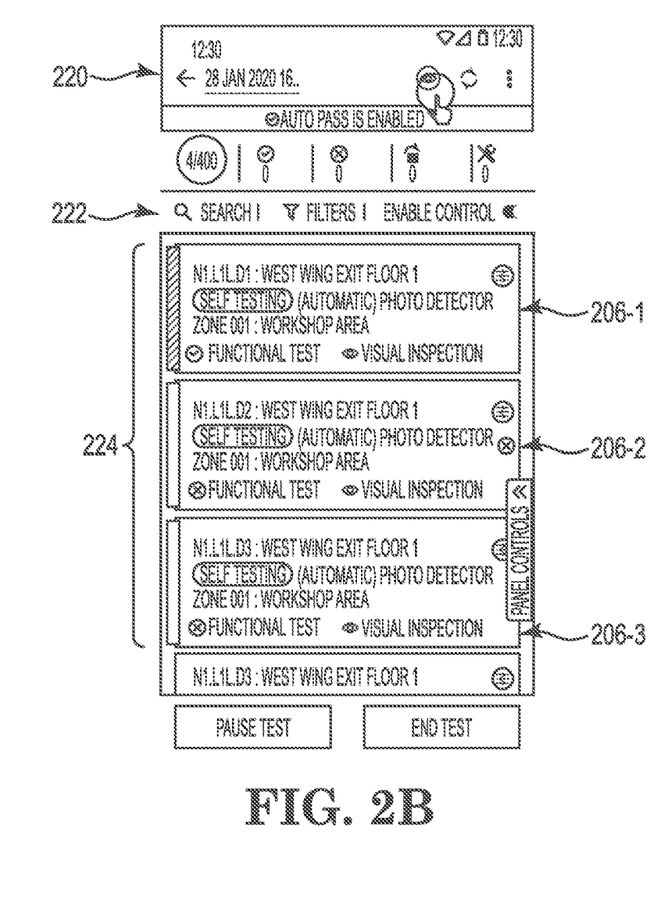
FIG. 2B is an illustration of a display provided on a user interface showing a device identification analysis including color coded event devices, generated in accordance with one or more embodiments of the present disclosure.

FIG. 2B is an illustration of a display provided on a user interface 220 showing a device identification analysis 222 including color coded event devices 206-1, 206-2, 206-3, generated in accordance with one or more embodiments of the present disclosure. The device identification analysis 222 can include a list 224 that can include, for instance, information about event devices 206-1, 206-2, 206-3.

As previously described in connection with FIG. 2A, the mobile device can display, on the user interface 220, the device identification analysis 222. The device identification analysis 222 can include the list 224 of event devices 206-1, 206-2, 206-3 from highest signal strength to lowest signal strength. The device identification analysis 222 can include an indication of which event device 206 has the beacon 208 having the highest signal strength with the mobile device, and can include color coding, as is further described herein.

As illustrated in FIG. 2B, the list 224 of event devices 206 can be color coded based on the signal strength between the mobile device and each beacon of each event device 206 of the group. For example, as indicated in FIG. 2B by the solid rectangle adjacent to the event device 206-1, the event device 206-1 can be color coded differently than the event devices 206-2 and 206-3 as the event device 206-1 can include a beacon that has a higher signal strength with the mobile device than beacons included in event devices 206-2 and 206-3. That is, the event devices 206 included in the list 224 can be color coded according to the signal strength between the mobile device and the beacon of each event device 206.

The event device 206-1 can be color coded differently than the other event devices 206-2 and 206-3. For example, as illustrated in FIG. 2B, the event device 206-1 can include a solid rectangle adjacent to the event device 206-1, whereas the event devices 206-2 and 206-3 can include white rectangles with a black border. Such a solid rectangle can represent color coding of the event device 206-1 indicating event device 206-1 has a beacon with a higher signal strength with the mobile device than beacons included in event devices 206-2 and 206-3.

Although the event device 206-1 is illustrated in FIG. 2B and described above as including an indication comprising color coding to illustrate the event device 206-1 has the beacon having the highest signal strength with the mobile device, embodiments of the present disclosure are not so limited. For example, the event device 206-1 can include a unique marking (e.g., an "X", a circle, or other icon) to indicate to a user of the mobile device that the event device 206-1 has the beacon having the highest signal strength with the mobile device.

Figure 3A:
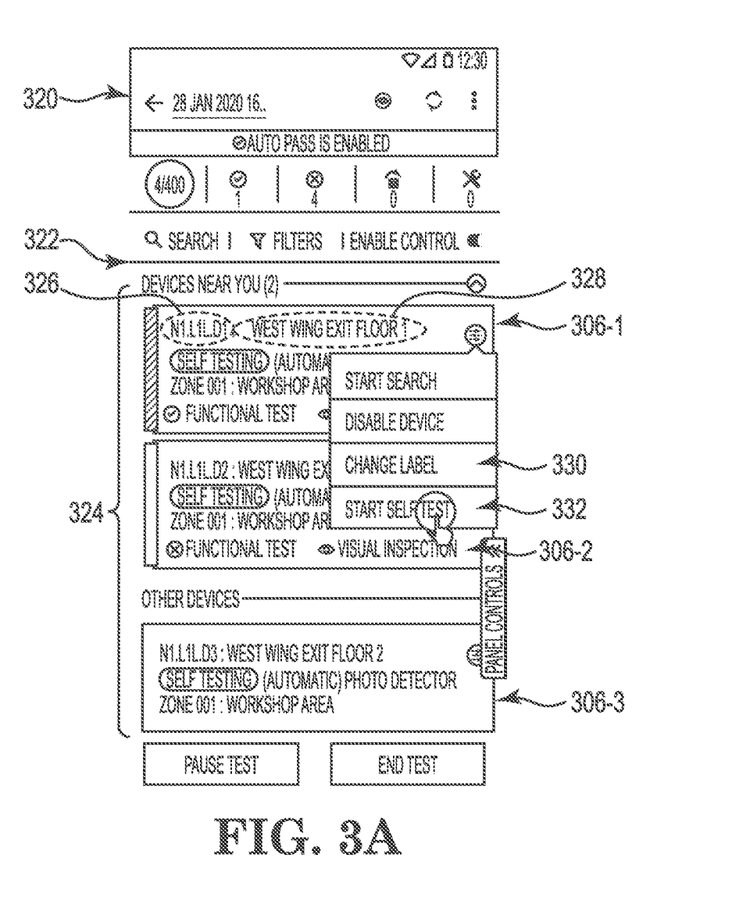
FIG. 3A is an illustration of a display provided on a user interface showing a device identification analysis including causing an audit action to be initiated, generated in accordance with one or more embodiments of the present disclosure.

FIG. 3A is an illustration of a display provided on a user interface 320 showing a device identification analysis 322 including causing an audit action to be initiated, generated in accordance with one or more embodiments of the present disclosure. The device identification analysis 322 can include a list 324 that can include, for instance, information about event devices 306-1, 306-2, 306-3.

As previously described in connection with FIG. 2A, the mobile device can display, on the user interface 320, the device identification analysis 322. The device identification analysis 322 can include the list 324 of event devices 306-1, 306-2, 306-3 from highest signal strength to lowest signal strength.

The mobile device can receive, via the device identification analysis 322 displayed on the user interface 320, an input for an event device 306 in the list 324 to take an audit action. For example, the event device 306-1 is indicated in FIG. 3A as having a beacon having the highest signal strength with to the mobile device (e.g., by way of being color coded as such as well as being listed first in the list 324). The mobile device can receive an input for the event device 306-1 to take an audit action, and the mobile device can initiate the audit action to be taken by the event device 306-1 in response to the input, as is further described herein. As another example, the mobile device can receive an input for the event device 306-2 to take an audit action, and the mobile device can initiate the audit action to be taken by the event device 306-2 in response to the input, as is further described herein.

In some examples, the mobile device can initiate the audit action to be taken for the event device 306-1 by modifying an address 326 of the event device 306. For example, the address 326 for the event device 306-1 may be indicated on the user interface 320 as "N1.L1.D1", and the user may notice that address 326 is incorrect. The user may modify the address 326 by entering an input to the mobile device at the device identification analysis 322.

In addition and/or alternatively to modifying the address 326 of the event device 306, the mobile device can initiate the audit action to be taken for the event device 306-1 by modifying a label 328 of the event device 306. For example, the label 328 for the event device 306-1 may be indicated on the user interface 320 as "West Wing Exit Floor 1", and the user may notice that label 328 is incorrect. The user may modify the label 328 by selecting a change label input 330 via the user interface 320 and can modify the label 328 accordingly.

Additional audit actions can include a maintenance self-test. The mobile device can initiate an audit action to be taken by causing the event device 306 to perform a maintenance self-test. For example, as previously described in connection with FIG. 1, the event devices 306 can be automatic, self-test devices which can be performed in order to test the event device's specific sensing capabilities (e.g., smoke, CO, heat, etc.). The mobile device can cause the event device 306-1 to perform a maintenance self-test by selecting a maintenance self-test input 332 (e.g., "Start Self-Test") as illustrated in FIG. 3A. Further, in the event the event device 306-1 fails the maintenance self-test, the mobile device can cause the event device 306-1 to take other actions (e.g., take corrective measures, re-running the maintenance self-test, etc.)

The mobile device can initiate an audit action to be taken by recording, for an inspection, inspection data about the event device 306. For example, the user of the mobile device may perform a visual inspection of the event device 306-1 and can record audible inputs about the event device 306-1 via an audio input device of the mobile device (e.g., a microphone), can record textual inputs about the event device 306-1 to the mobile device via the user interface 320, can record photos and/or video of the event device 306-1 via an image capture device (e.g., a camera) of the mobile device, etc. Such visual (e.g., photos and/or video), audible, and/or textual inputs may include, for instance, images and/or descriptions of the event device 306-1 such as an image and/or description of the appearance of event device 306-1 (e.g., new, old, dirty, clean, etc.), an image and/or description of the location of the event device 306-1 (e.g., located behind a column near the ceiling, etc.), an image and/or description of the age of the event device 306-1, among other examples.

The mobile device can generate a report about the audit action. For example, the mobile device can generate a report for the event device 306-1 detailing results of any maintenance self-tests executed, detailing inspection data, any address 326 or label 328 modifications, among other information. Further, the mobile device can add a signature to such a report, where the signature may be a predetermined signature associated with a user of the mobile device.

Lastly, the mobile device can upload the audit action to a remote computing device. For example, as previously described in connection with FIG. 1, the mobile device can upload the audit action including any generated reports to a remote computing device upon establishing/re-establishing a network relationship via a network to ensure that any audit actions taken by the event devices 306 via the mobile device are properly synced.

In some instances, the event device 306 may detect an actual hazard event occurring in the facility. In such an instance, the mobile device can terminate the audit action in response to the hazard event being detected by the event device 306. For example, while the user is recording inspection data for the event device 306-1, the event device 306-1 may detect levels of CO in the building space that exceed a threshold amount and as a result determine a hazard event is occurring. The mobile device can, in response, terminate the recording of inspection data to allow the event device 306-1 to transmit information regarding the CO levels in the building space to a control panel.

Figure 3B:
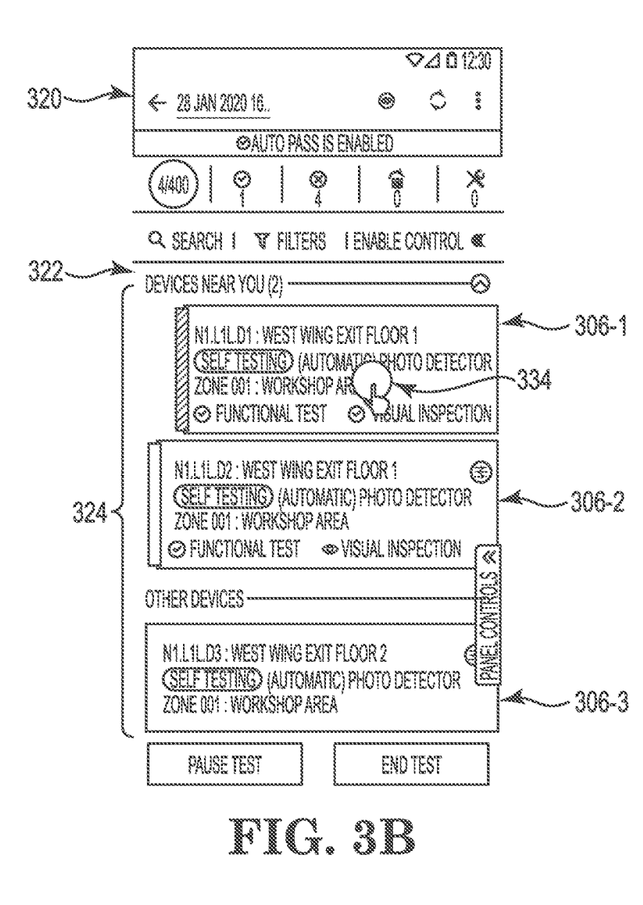
FIG. 3B is an illustration of a display provided on a user interface showing a device identification analysis including receiving an input, generated in accordance with one or more embodiments of the present disclosure.

FIG. 3B is an illustration of a display provided on a user interface 320 showing a device identification analysis 322 including receiving an input 334, generated in accordance with one or more embodiments of the present disclosure. The input 334 can be made to the device identification analysis 322 displayed via the user interface 320.

As illustrated in FIG. 3B, the mobile device can receive, via the device identification analysis 322 displayed on the user interface 320, an input 334 that the inspection is completed. For example, a user may perform an inspection on the event device 306-1 and, once completed, indicate as such by providing the input 334 to the user interface 320. The input can be, for example, a "swiping" motion where the user utilizes their finger to select the event device 306-1 and "swipes" across a screen of the mobile device displaying the user interface 320. The mobile device can mark the inspection as completed in response to receiving the input.

Once the mobile device has received the input 334 indicating the audit action is completed, the mobile device can remove the event device 306 from the list 324 of event devices 306 in response to receiving the input 334. For example, a user can complete the audit action for the event device 306-1 and "swipe" it from the list 324. The mobile device can update the list 324 to remove the event device 306-1 from the list 324. Removal from the list 324 can ensure a user does not perform further audit actions on the event device 306-1 that may be redundant.

As such, event device maintenance according to the present disclosure can allow for a user to utilize a mobile device to be in communication with and initiate audit actions to be taken by event devices in a facility, even in instances where the mobile device may not have a network relationship available. Such an approach can allow for the user of the mobile device to more easily determine and confirm which event device they are interacting with to avoid errors in the testing process, as compared with previous approaches.

Figure 4:
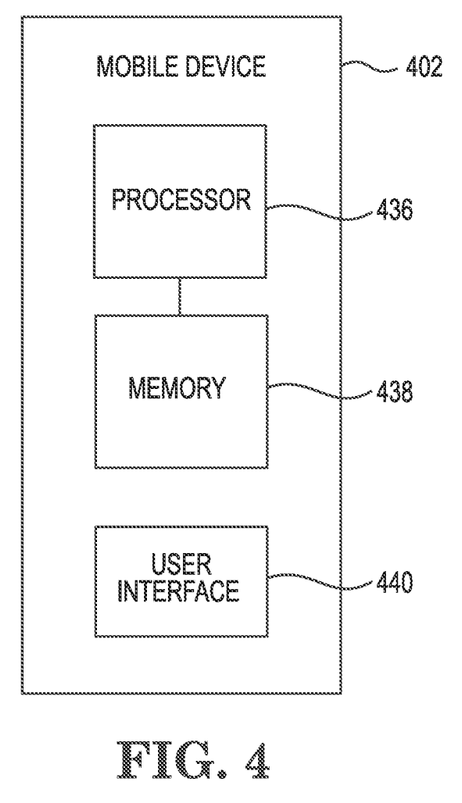
FIG. 4 is an example of a mobile device for event device maintenance, in accordance with one or more embodiments of the present disclosure.

FIG. 4 is an example of a mobile device 402 for event device maintenance, in accordance with one or more embodiments of the present disclosure. As illustrated in FIG. 4, the mobile device 402 can include a memory 438 and a processor 436 for event device maintenance in accordance with the present disclosure.

The memory 438 can be any type of storage medium that can be accessed by the processor 436 to perform various examples of the present disclosure. For example, the memory 438 can be a non-transitory computer readable medium having computer readable instructions (e.g., executable instructions/computer program instructions) stored thereon that are executable by the processor 436 for event device maintenance in accordance with the present disclosure. The computer readable instructions can be executable by the processor 436 to redundantly generate an automated test analysis for event device maintenance.

The memory 438 can be volatile or nonvolatile memory. The memory 438 can also be removable (e.g., portable) memory, or non-removable (e.g., internal) memory. For example, the memory 438 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 438 is illustrated as being located within mobile device 402, embodiments of the present disclosure are not so limited. For example, memory 438 can also be located internal to another computing resource (e.g., enabling computer readable instructions to be downloaded over the Internet or another wired or wireless connection).

As illustrated in FIG. 4, mobile device 402 includes a user interface 440. For example, the user interface 440 can display a device identification analysis (e.g., as previously described in connection with FIGS. 1, 2A, 2B, 3A, and 3B) in a single integrated display. A user (e.g., operator) of mobile device 402 can interact with mobile device 402 via user interface 440. For example, user interface 440 can provide (e.g., display and/or present) information to the user of mobile device 402, and/or receive information from (e.g., input by) the user of mobile device 402. For instance, in some embodiments, user interface 440 can be a graphical user interface (GUI) that can provide and/or receive information to and/or from the user of mobile device 402. The display can be, for instance, a touch-screen (e.g., the GUI can include touch-screen capabilities). Alternatively, a display can include a television, computer monitor, mobile device screen, other type of display device, or any combination thereof, connected to mobile device 402 and configured to receive a video signal output from the mobile device 402.

As an additional example, user interface 440 can include a keyboard and/or mouse the user can use to input information into mobile device 402. Embodiments of the present disclosure, however, are not limited to a particular type(s) of user interface.

User interface 440 can be localized to any language. For example, user interface 430 can utilize any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for event device maintenance, comprising:
   a user interface;
   a memory; and
   a processor configured to execute executable instructions stored in the memory to:
      receive an inventory including a group of event devices;
      generate, using the inventory, a device identification analysis for the group of event devices including:

a list of the event devices of the group based on a signal strength between the mobile device and each event device of the group; and
an indication of which event device of the group has the highest signal strength with the mobile device;
display, on the user interface, the device identification analysis;
transmit, to a gateway device in response to receiving a first input to the user interface and prior to receiving a second input for an event device of the group to take an audit action, an indicator signal to cause a control panel to transmit the indicator signal to the event device of the group to cause the event device to emit a visual indicator in response to receiving the indicator signal from the control panel to identify the event device from other event devices in the group;
receive, via the device identification analysis displayed on the user interface, the second input for the event device of the group to take the audit action; and
initiate the audit action to be taken by the event device of the group in response to the second input.

2. The mobile device of claim 1, wherein the processor is configured to execute the instructions to determine the signal strength between the mobile device and a beacon included in each event device of the group.

3. The mobile device of claim 1, wherein the list of event devices is color coded based on the signal strength of the mobile device with each event device of the group.

4. The mobile device of claim 1, wherein the processor is configured to execute the instructions to initiate the audit action to be taken by modifying at least one of:
an address of the event device; and
a label of the event device.

5. The mobile device of claim 1, wherein the processor is configured to execute the instructions to initiate the audit action to be taken by recording, for an inspection, inspection data about the event device.

6. The mobile device of claim 5, wherein the processor is configured to:
receive, via the device identification analysis displayed on the user interface, a third input that the inspection is completed; and
mark the inspection as completed in response to receiving the third input.

7. The mobile device of claim 1, wherein the processor is configured to execute the instructions to initiate the audit action to be taken by causing the event device to perform a maintenance self-test.

8. The mobile device of claim 1, wherein the processor is configured to execute the instructions to upload the audit action to a remote computing device.

9. A system for event device maintenance, comprising:
a gateway device;
a group of event devices each including a beacon; and
a mobile device configured to:
receive an inventory of the group of event devices;
determine a signal strength between the mobile device and each beacon of each event device of the group;
generate using the inventory, a device identification analysis for the group of event devices that includes:
a list of the event devices of the group based on the signal strength between the mobile device and each beacon of each event device of the group; and
an indication of which event device of the group has a beacon having the highest signal strength with the mobile device;
display the device identification analysis on a user interface of the mobile device;
transmit, to the gateway device in response to receiving a first input to the user interface and prior to receiving a second input for an event device of the group to take an audit action, an indicator signal to cause a control panel to transmit the indicator signal to the event device of the group to cause the event device to emit a visual indicator in response to receiving the indicator signal from the control panel to identify the event device from other event devices in the group;
receive, via the device identification analysis, the second input for the event device of the group to take the audit action; and
initiate the audit action to be taken by the event device of the group in response to the second input.

10. The system of claim 9, wherein
the gateway device is configured to transmit the indicator signal to the event device of the group via the control panel.

11. The system of claim 10, wherein the indicator further includes
an audible indicator.

12. The system of claim 9, wherein the control panel is configured to transmit an enable signal to the group of event devices to cause each event device of the group to enable their beacons.

13. The system of claim 9, wherein the list of event devices includes event devices of the group of event devices whose beacons have a signal strength with the mobile device.

14. The system of claim 9, wherein the mobile device is configured to:
receive, via the device identification analysis, a third input that the audit action is completed; and
remove the event device from the list of event devices in response to receiving the third input.

15. A computer implemented method for event device maintenance, comprising:
receiving, by a mobile device, an inventory of a group of event devices;
determining, by the mobile device, a signal strength between the mobile device and a beacon of each event device of the group;
generating, by the mobile device using the inventory, a device identification analysis for the group of event devices that includes:
a list of the event devices of the group based on the signal strength between the mobile device and each beacon of each event device of the group; and
an indication of which event device of the group has a beacon having the highest signal strength with the mobile device;
displaying, by a user interface of the mobile device, the device identification analysis;
transmitting, by the mobile device to a gateway device in response to receiving a first input to the user interface and prior to receiving a second input for an event device of the group to take an audit action, an indicator signal to cause a control panel to transmit the indicator signal to the event device of the group to cause the event device to emit a visual indicator in response to receiving the indicator signal from the control panel to identify the event device from other event devices in the group;

receiving, via the device identification analysis, a second input for the event device of the group to take the audit action; and causing, by the mobile device, the audit action to be initiated by the event device of the group in response to receiving the second input.

16. The method of claim 15, wherein the event devices are included in the list from highest signal strength to lowest signal strength.

17. The method of claim 15, wherein the event devices are color coded in the list according to the signal strength between the mobile device and the beacon of each event device of the group.

18. The method of claim 17, wherein the indication includes color coding the event device of the group that has the beacon having the highest signal strength with the mobile device differently than the other event devices included in the list of event devices.

19. The method of claim 15, wherein the method includes generating, by the mobile device, a report about the audit action.

20. The method of claim 15, wherein the method includes terminating, by the mobile device, the audit action in response to a hazard event being detected by the event device of the group.

* * * * *